United States Patent [19]

Bigelow

[11] 4,082,949

[45] Apr. 4, 1978

[54] VARIABLE INTENSITY FLUORESCENT DISPLAY

[75] Inventor: John E. Bigelow, Rexford, N.Y.

[73] Assignee: General Electric Company, Schenectady, N.Y.

[21] Appl. No.: 739,748

[22] Filed: Nov. 8, 1976

[51] Int. Cl.[2] .............................................. G03B 21/00

[52] U.S. Cl. ..................................... 250/329; 250/504

[58] Field of Search ................ 250/329, 495, 504, 484

[56] References Cited

U.S. PATENT DOCUMENTS

| | | | |
|---|---|---|---|
| 2,996,617 | 8/1961 | Heckscher | 250/329 |
| 3,015,731 | 1/1962 | van Santen et al. | 250/484 X |
| 3,207,898 | 9/1965 | Linsley | 250/329 X |
| 3,621,249 | 11/1971 | Kikumoto | 250/329 |

*Primary Examiner*—Archie R. Borchelt
*Attorney, Agent, or Firm*—Geoffrey H. Krauss; Joseph T. Cohen; Jerome C. Squillaro

[57] ABSTRACT

A variable intensity fluorescent display, utilizing fluorescent segments for forming indicia when irradiated by an ultraviolet lamp, utilizes a separate source of infrared light, such as a variable intensity incandescent lamp and deep red, or infrared, filter and the like to provide quenching action in the fluorescent material in a controlled manner.

11 Claims, 1 Drawing Figure

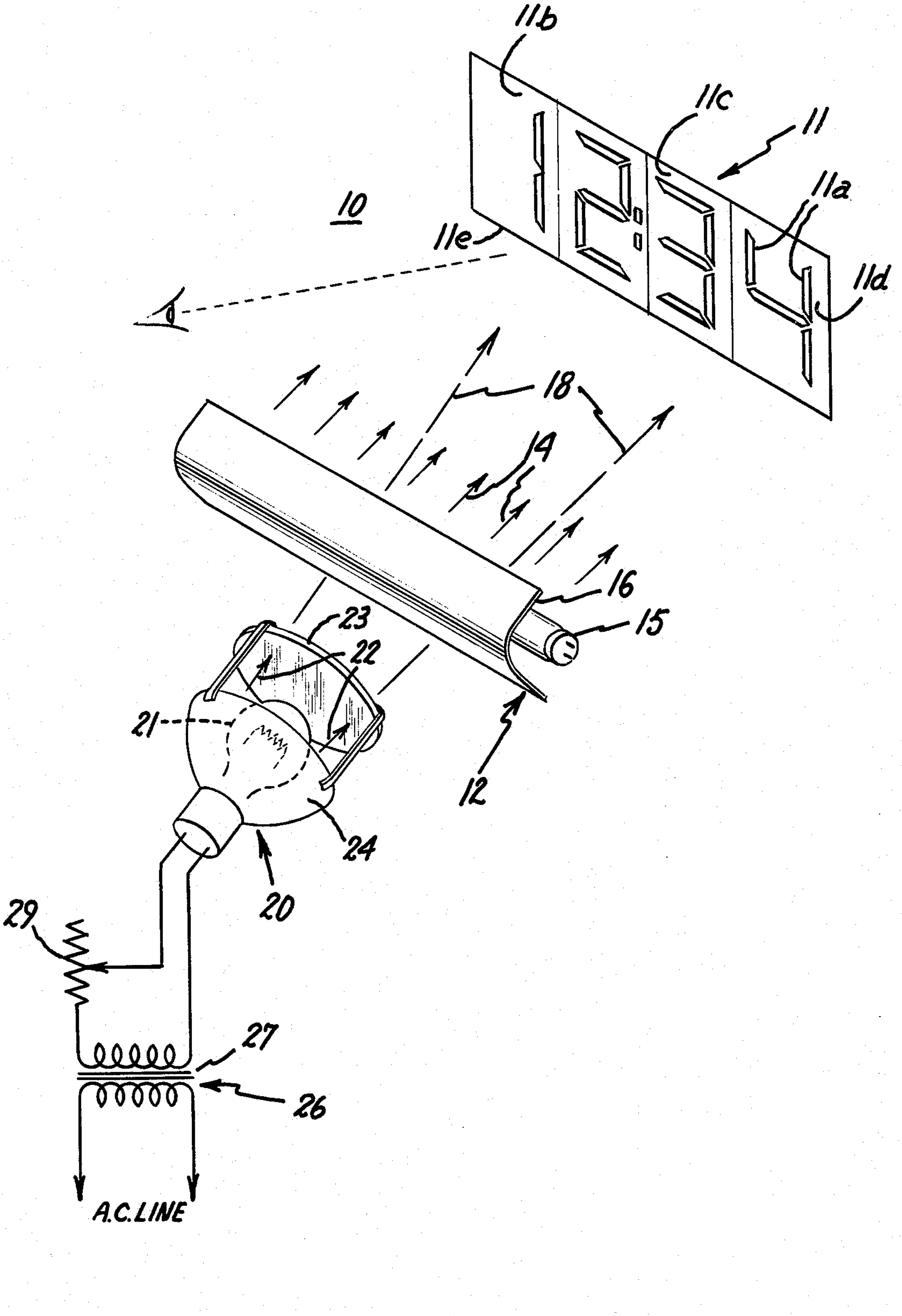
11b
11c
11
11a
10
11e
11d
18
14
16
15
23
22
21
12
24
20
29
27
26
A.C. LINE

VARIABLE INTENSITY FLUORESCENT DISPLAY

BACKGROUND OF THE INVENTION

The present invention relates to fluorescent displays and, more particularly, to a novel fluorescent display having variable intensity.

Fluorescent displays are known wherein indicia, which may be comprised of segments selectively activated, fluoresce responsive to illumination by ultraviolet radiation. Typically, the brightness of the fluorescent phenomena is established at a constant level by the radiation output of an ultraviolet radiation source which cannot be adjusted, i.e. the ultraviolet source, typically comprising a lamp of the gas-discharge type, is not adaptable for adjustable radiation output. A fluorescent display of the type having a variable intensity, is desirable.

BRIEF SUMMARY OF THE INVENTION

In accordance with the invention, a variable intensity fluorescent display comprises display means having a pattern of fluroescent material, preferably arranged in actuatable segments forming indicia, symbols and the like; a source of ultraviolet radiation positioned to illuminate the fluorescent material and having a radiation output establishing a maximum fluorescence level for the display; and means for simultaneously irradiating the fluorescent material with a variable magnitude of infrared radiation to cause quenching action of like variable magnitude in the fluorescent material, whereby the magnitude of the light emitted by fluorescence is reduced for increasing incident infrared radiation illuminating the display. Preferably, the source of infrared radiation comprises an incandescent bulb having a deep red or infrared transmitting filter placed between the bulb and the display, and means, such as a variable voltage power source, for adjusting the intensity of the light emitted by the incandescent bulb and hence controlling the amount of infrared radiation received by the display to vary the intensity of the fluorescent discharge thereof.

Accordingly, it is one object of the present invention to provide a novel variable intensity fluorescent display.

This and other objects of the present invention will become apparent upon consideration of the following detailed description and the accompanying drawings.

BRIEF DESCRIPTION OF THE DRAWINGS

The sole FIGURE is a perspective view of a variable intensity fluorescent display in accordance with the principles of the present invention.

DETAILED DESCRIPTION OF THE INVENTION

Referring now to the sole FIGURE, a variable intensity fluorescent display 10 comprises a display means 11 having a plurality of selectable indicia, symbols and the like formed of patterns of material fluorescing and emitting visible radiation when illuminated by ultraviolet radiation 14 from a radiation source means 12. Thus, a fluorescent display for a digital clock may comprise a set of mechanically actuated panel groups 11*b*, 11*c* and 11*d*, with each panel of each group of the set bearing different numerical indicia comprised of patterns of segments 11*a* of the fluorescing material. The panels 11*b*–11*d* are exposed to ultraviolet radiation 14 from source means 12 in horological manner by known mechanisms. Upon receipt of incident ultraviolet (UV) radiation 14, each fluorescing material segment 11*a* upon which the UV radiation impinges is caused to fluoresce to emit observable light having visible wavelengths.

Ultraviolet source means 12 typically comprises an ultraviolet lamp 15 of the gas-discharge type, mounted at the focus of a cylindrical or quasi-parabolic reflector 16. The ultraviolet source means 12 is positioned in front of, and below the bottom edge 11*e* of, display means 11 whereby UV radiation 14 may illuminate the entire indicia bearing surface of display panels 11*b*–11*d* without the source means 12 blocking the resulting visible light produced thereby. The intensity of ultraviolet radiation 14 is established by the discharge characteristics of, and the current flowing (from electrical source means not shown for purposes of simplicity) in, the lamp. The substantially constant magnitude of ultraviolet radiation 14 establishes the maximum visible brightness of display 10.

As the discharge characteristics of a selected lamp 15 cannot be easily varied to control the visible brightness of the display, I have found that illumination of the fluorescent material with variable magnitudes of infrared radiation 18 produces a substantially proportional quenching action in the fluorescent material, whereby decreasing visible brightness is observed with increasing infrared illumination (with the magnitude of the ultraviolet radiation being maintained essentially constant) by means of the well-known infrared radiation quenching action in the fluorescent material.

Infrared radiation 18, of variable magnitude, is provided, in accordance with the invention, by a quenching source means 20 preferably comprised of an incandescent lamp 21 producing radiation 22 at visible and infrared wavelengths for filtering by a deep red, or infrared, filter means 23 positioned between the incandescent lamp and the display means. Quenching source means 20 is positioned in front of the indicia bearing display means 11 and may be positioned respectively above or below the respective top or bottom edges thereof to prevent blockage of the observable fluorescence of indicia 11*a*. As illustrated, a lamp holder 24, in which incandescent lamp 21 may be conveniently mounted for positioning and facilitation of electrical connection, and to which filter means 23 may be secured, is positioned in front of and below display means 11 at a position allowing the transmitted infrared radiation 18 to be directed at the front surface of display means 11 without blockage by the ultraviolet radiation source means 12.

As previously mentioned hereinabove, increasing the magnitude of infrared radiation 18 serves to increasingly quench the fluorescence activity of the material contained in segments 11*a* to produce decreasing magnitudes of visible light. Variable intensity of the display is produced by varying the magnitude of infrared radiation 18 by energizing incandescent lamp 21 from a variable voltage source means 27, typically comprised of a step-down transformer 27 having its primary winding coupled to an AC power line and having its secondary winding coupled through a variable resistance means 29, such as rheostat and the like, to the incandescent lamp contacts of socket 24. Thus, by adjusting the rheostat for maximum resistance, a minimum amplitude of current flow is facilitated through incandescent lamp 21 to produce a minimum magnitude of infrared radiation 18 and minimum quenching action, whereby maximum visible brightness of the display is observable; decreasing the electrical resistance of means 29 facilitates increased current flow through incandescent lamp 21 to increase the amount of infrared radiation impinging upon the fluorescent material, whereby increased quenching action occurs to cause a decrease in the magnitude of observable light from the display. In this manner, a simple and cost-effective variable intensity fluorescent display is achieved which does not require mechanical change of optical components, such as polarizers and the like.

The variable intensity fluorescent display just described is particularly advantageous in low power applications, such as the aforementioned digital clock, wherein miniature components, occupying the smallest physical volume, are advantageously utilized.

While the present invention has been described with reference to one preferred embodiment thereof, many variations and modifications will now occur to those skilled in the art. It is my intention, therefore, to be limited not by the scope of the present disclosure but only by the scope of the appending claims.

What is claimed is:

1. A variable intensity fluorescent display comprising:

display means for direct viewing of indicia, said display means having at least one selectable indicia formed permanently thereon of a material fluorescing at visible wavelengths responsive to excitation by radiation of a first range of wavelengths;

first means for illuminating said at least one indicia with a substantially constant magnitude of radiation of said first wavelength range to establish a maximum brightness of said indicia; and second means for illuminating said at least one indicia with an adjustably varying magnitude of radiation of a second range of wavelengths differing from said first wavelength range and selected to produce a variable quenching action in all of said indicia to variably reduce the brightness of the visible wavelength fluorescence therefrom.

2. A display as set forth in claim 1, wherein said first and second wavelength ranges are respectively within the ultraviolet and infrared portions of the electromagnetic spectrum.

3. A display as set forth in claim 2, wherein said second means comprises third means for producing infrared radiation of varying magnitude in accordance with the magnitude of an electrical parameter supplied to said third means; and a source of said adjustable parameter having means for adjusting the magnitude thereof.

4. A display as set forth in claim 3, wherein said third means is an incandescent lamp emitting radiation of at least one wavelength in the deep red and infrared portions of the electromagnetic spectrum; and a filter means, positioned between said incandescent lamp and said display means, for transmitting said at least one wavelength of said deep red and infrared radiations to said display means.

5. A display as set forth in claim 4, wherein said second means further includes socket means for supporting said incandescent lamp and for facilitating electrical connection thereto from said source means.

6. A display as set forth in claim 5, wherein said socket means supports said filter means.

7. A display as set forth in claim 4, wherein said source means comprises a source of electrical potential and variable resistance means connected in series between said electrical potential source and said incandescent lamp for varying the magnitude of a current flowing through said lamp.

8. A display as set forth in claim 2, wherein said first means comprises a lamp emitting ultraviolet radiation.

9. A display as set forth in claim 8 wherein, said first means further comprises means for directing substantially all of the ultraviolet radiation from said lamp toward said display means.

10. A display as set forth in claim 8, wherein said lamp is a gas-discharge lamp.

11. A display as set forth in claim 1, wherein said first and second means are positioned to allow substantially all of the visible light emitted by said fluorescent material to be observable upon a surface of said display means receiving the first and second wavelength radiations.

* * * * *